United States Patent
Patil et al.

(10) Patent No.: US 12,045,206 B2
(45) Date of Patent: *Jul. 23, 2024

(54) IMAGE BLOCKCHAIN SYSTEM AND METHOD

(71) Applicant: Visa International Service Association, San Francisco, CA (US)

(72) Inventors: Ajit Vilasrao Patil, Singapore (SG); Atindra Nath Ghosh, Singapore (SG); Balkrishna Dinesh Pangam, Singapore (SG)

(73) Assignee: Visa International Service Association, San Francisco, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/888,706

(22) Filed: Aug. 16, 2022

(65) Prior Publication Data

US 2022/0391360 A1 Dec. 8, 2022

Related U.S. Application Data

(63) Continuation of application No. 16/352,383, filed on Mar. 13, 2019, now Pat. No. 11,449,472.

(51) Int. Cl.
*G06F 16/182* (2019.01)
*G06Q 20/38* (2012.01)
(Continued)

(52) U.S. Cl.
CPC ....... *G06F 16/1824* (2019.01); *G06Q 20/382* (2013.01); *H04L 9/0643* (2013.01); *H04L 9/50* (2022.05)

(58) Field of Classification Search
None
See application file for complete search history.

(56) References Cited

U.S. PATENT DOCUMENTS

2019/0108323 A1* 4/2019 Mintz .................. H04L 9/3213
2019/0213312 A1 7/2019 Tussy
(Continued)

OTHER PUBLICATIONS

U.S. Appl. No. 16/352,383, "Final Office Action", Mar. 9, 2022, 24 pages.
(Continued)

*Primary Examiner* — Giuseppi Giuliani
(74) *Attorney, Agent, or Firm* — Kilpatrick Townsend & Stockton LLP

(57) ABSTRACT

A method includes a full node storing a blockchain and being one of a plurality of full nodes forming a blockchain network receiving a message comprising update image data and a smart contract identifier from a first user device. The full node can then determine stored image data associated with the smart contract identifier. The full node can also determine whether or not image comparison data based on received image data and stored image data is consistent with a smart contract associated with the smart contract identifier and can then generate an entry for a block of the blockchain, comprising at least the smart contract identifier, the updated image data, and image comparison data. The full node can generate the block of the blockchain and transmit the block to the plurality of full nodes. The plurality of full nodes respectively verify the block. The full node can store the block on the blockchain and transmit an indication of whether or not the block was stored on the blockchain to the first user device.

19 Claims, 8 Drawing Sheets

(51) Int. Cl.
*H04L 9/06* (2006.01)
*H04L 9/00* (2022.01)

(56) References Cited

U.S. PATENT DOCUMENTS

| | | |
|---|---|---|
| 2019/0333030 A1* | 10/2019 | Ramasamy ........ G06Q 20/3674 |
| 2019/0333121 A1 | 10/2019 | Ahroon |
| 2020/0143466 A1* | 5/2020 | Wu ....................... H04L 9/3239 |
| 2020/0294002 A1* | 9/2020 | Liu ....................... G06Q 10/20 |
| 2021/0065324 A1 | 3/2021 | Zhao et al. |
| 2022/0253842 A1* | 8/2022 | James ...................... H04L 9/50 |

OTHER PUBLICATIONS

U.S. Appl. No. 16/352,383 , "Non-Final Office Action", Oct. 21, 2021, 20 Pages.
U.S. Appl. No. 16/352,383 , "Notice of Allowance", May 18, 2022, 7 pages.

* cited by examiner

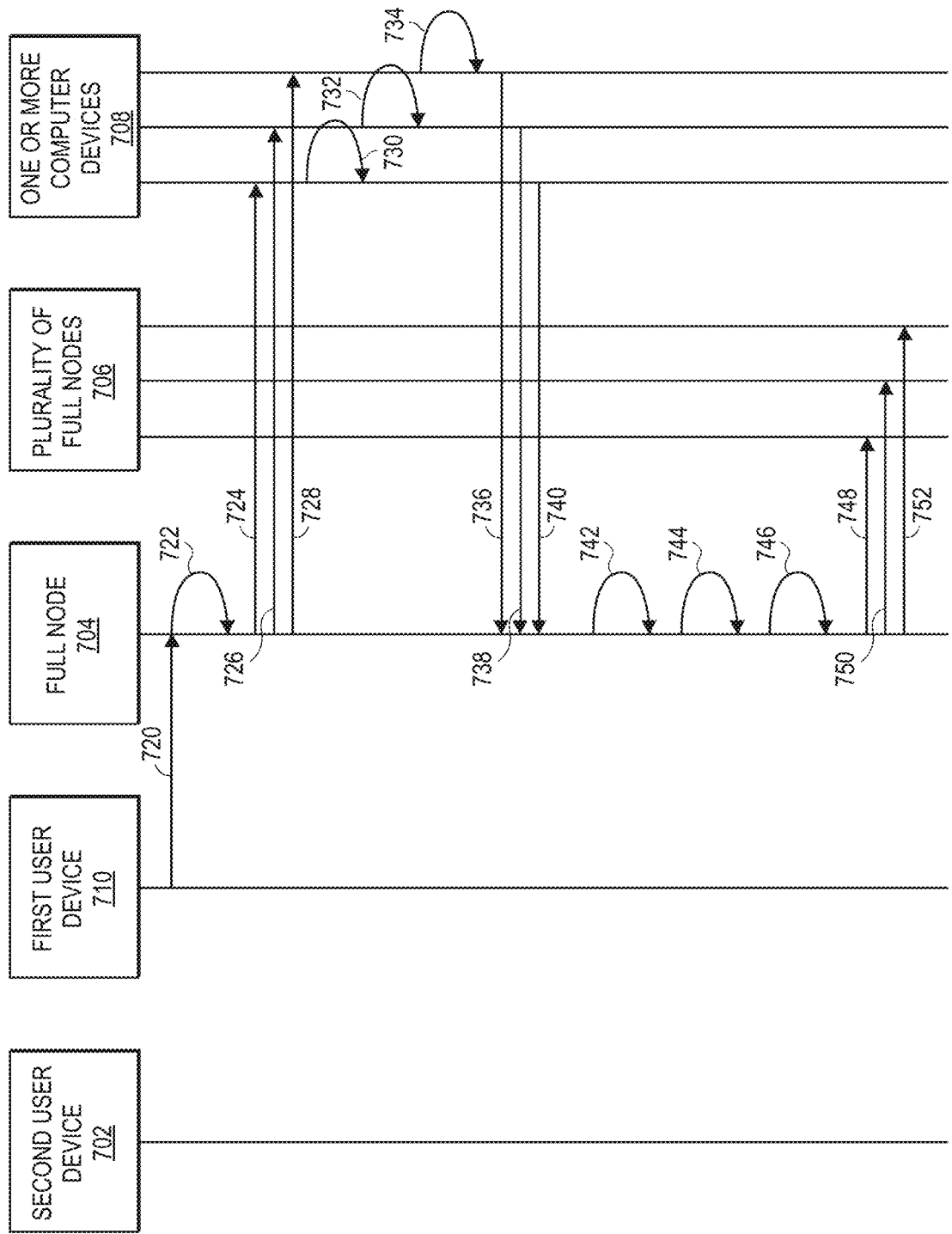

IMAGE BLOCKCHAIN SYSTEM AND METHOD

CROSS-REFERENCE TO RELATED APPLICATIONS

This application is a continuation of U.S. patent application Ser. No. 16/352,383, filed on Mar. 13, 2019, which is herein incorporated by reference in its entirety for all purposes.

BACKGROUND

Current blockchain networks allow users to submit interactions (e.g., transactions, etc.) to nodes in the blockchain network. The nodes can create and store a block including the interaction. Some blockchain networks include smart contracts, which may allow users to interact with one another under a set of rules enforced by the smart contract.

However, conventional smart contracts and blockchain networks have limited capabilities. For example, compliance with a smart contract can require various parties to indicate their completion of certain obligations under the smart contract. As an illustration, in a transaction that involves the transference of a particular physical asset from one party to another (e.g., a car rental), the data regarding condition of the asset as it is in the hands of the different parties can be manually recorded by the parties and can include subjective information (e.g., small scratch, dirty, etc.).

Embodiments of the invention address this problem and other problems individually and collectively.

SUMMARY

Embodiments of the invention are related to methods and systems of storing image data and smart contracts on a blockchain.

One embodiment is related to a method comprising: receiving, by a full node storing a blockchain, a message comprising update image data and a smart contract identifier from a first user device, the full node being one of a plurality of full nodes forming a blockchain network; determining, by the full node, stored image data associated with the smart contract identifier; determining, by the full node, whether or not image comparison data of the updated image data and the stored image data is consistent with a smart contract associated with the smart contract identifier; generating, by the full node, an entry for a block of the blockchain, comprising at least the smart contract identifier, the updated image data, and image comparison data; generating, by the full node, the block of the blockchain; transmitting, by the full node, the block to the plurality of full nodes, wherein the plurality of full nodes respectively verify the block; storing, by the full node, the block on the blockchain; and transmitting, by the full node, an indication of whether or not the block was stored on the blockchain to the first user device.

Another embodiment is related to a full node comprising: a processor; a memory device; and a computer-readable medium coupled to the processor, the computer-readable medium comprising code executable by the processor for implementing a method comprising: receiving, by the full node storing a blockchain, a message comprising update image data and a smart contract identifier from a first user device, the full node being one of a plurality of full nodes forming a blockchain network; determining stored image data associated with the smart contract identifier; determining whether or not image comparison data of the updated image data and the stored image data is consistent with a smart contract associated with the smart contract identifier; generating an entry for a block of the blockchain, comprising at least the smart contract identifier, the updated image data, and image comparison data; generating the block of the blockchain; transmitting the block to the plurality of full nodes, wherein the plurality of full nodes respectively verify the block; storing the block on the blockchain; and transmitting an indication of whether or not the block was stored on the blockchain to the first user device.

One embodiment is related to a method comprising: receiving, by a full node storing a blockchain, an asset request message comprising an asset type and a first user identifier from a first user device; determining, by the full node, an entry in the blockchain associated with the asset type, wherein the entry includes at least a second user identifier; transmitting, by the full node to a second user device associated with the second user identifier, a contract request message comprising the asset type and the first user identifier; receiving, by the full node from the second user device, an contract response message indicating whether or not to create a smart contract; if the contract response message indicates to create the smart contract, generating, by the full node, the smart contract including at least the first user identifier, the second user identifier, the asset type, and a smart contract identifier; generating, by the full node, a new entry for a block of the blockchain, comprising at least the smart contract; generating, by the full node, the block of the blockchain; transmitting, by the full node, the block to a plurality of full nodes, wherein the plurality of full nodes respectively verify the block; storing, by the full node, the block on the blockchain; and transmitting, by the full node, an indication of whether or not the block was stored on the blockchain to the first user device and the second user device.

Further details regarding embodiments of the invention can be found in the Detailed Description and the Figures.

BRIEF DESCRIPTION OF THE DRAWINGS

FIGS. 7A and 7B show a flow diagram illustrating an update image data process according to an embodiment of the invention.

DETAILED DESCRIPTION

Figure 1:
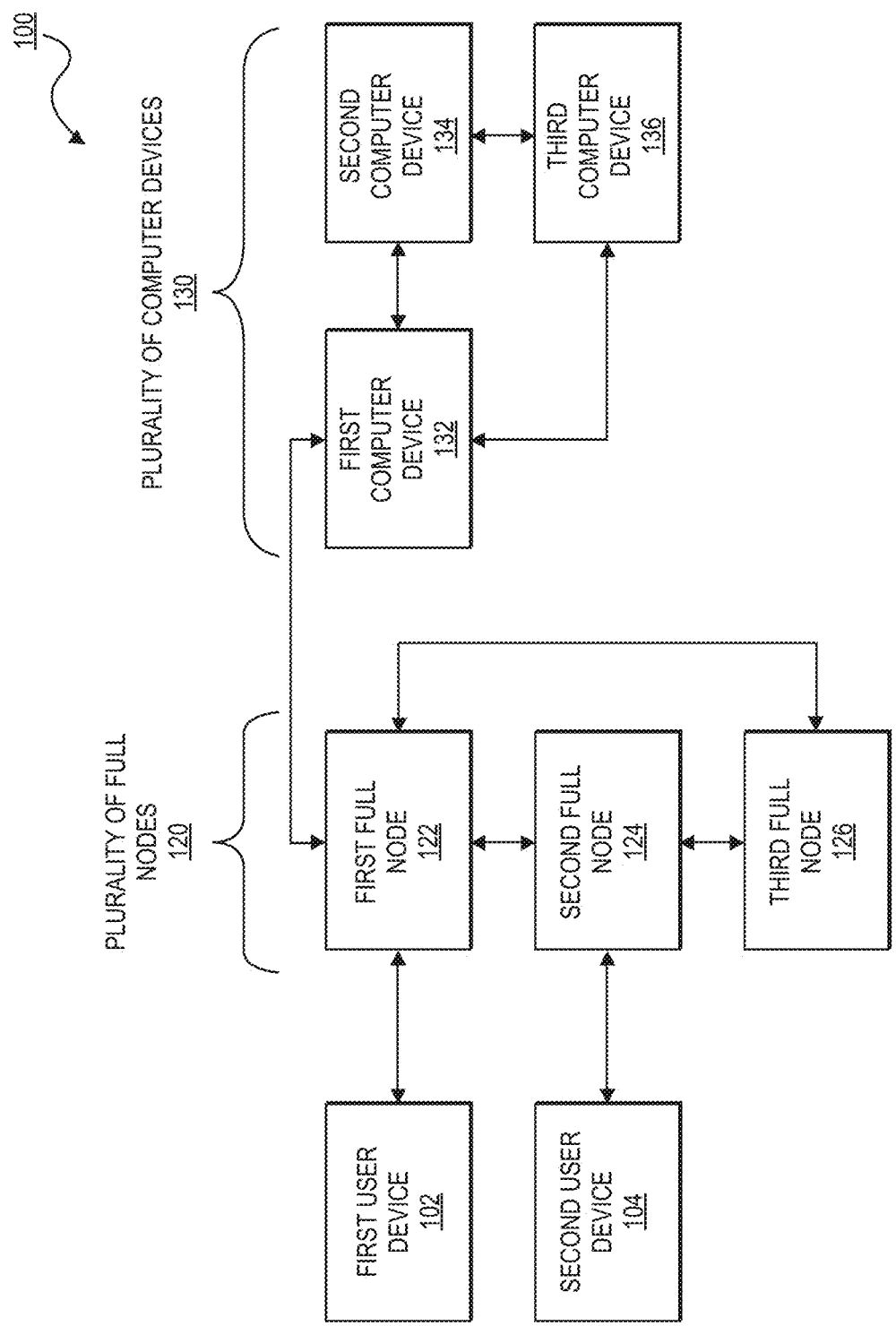
FIG. 1 shows a block diagram of a system illustrating a verification network according to embodiments of the present invention.

Prior to discussing embodiments of the invention, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G, or similar networks), Wi-Fi, Wi-Max, or any other communication medium that may provide access to a network such as the Internet or a private network.

A "light client" may be an application or software capable of communicating with a verification network. The light client may, for example, be present on a user device. In some embodiments, a light client may communicate with a verification network and verify a longest blockchain and/or block(s).

A "verification network" may be any set of nodes (computer systems and components) configured to provide verification for an interaction. The verification network may comprise a distributed computing environment utilizing several nodes that are interconnected via communication links, using one or more computer networks or direct connections. The verification network may be implemented over any appropriate network, including an intranet, the Internet, a cellular network, a local area network or any other such network or combination thereof. Components used for such a system can depend at least in part upon the type of network and/or environment selected. Communication over the verification network can be enabled by wired or wireless connections and combinations thereof. Nodes may be independently operated by third parties and may be added to, or removed from, the verification network on a continuous basis. In some embodiments, a node in a verification network may be a full node. In some embodiments, a verification network may be a private network of nodes.

A "node" may be a point at which lines or pathways intersect or branch or can be a central or connecting point. A node can also be a "computer node," which can be any computer or device that connects to the verification network. A node that can fully verify each block and interaction in the blockchain can be a full node. A "full node" can store the full blockchain (i.e., each block and each interaction). In some embodiments, a "user device" may be a computer node in the verification network.

The term "verification" and its derivatives may include a process that utilizes information to determine whether an underlying subject is valid under a given set of circumstances. Verification may include any comparison of information to ensure some data or information is correct, valid, accurate, legitimate, and/or in good standing.

A "blockchain" can be a distributed database that maintains a continuously-growing list of records secured from tampering and revision. A blockchain may include a number of blocks of interaction records. Each block in the blockchain can contain also include a timestamp and a link to a previous block. Stated differently, interaction records in a blockchain may be stored as a series of "blocks," or permanent files that include a record of a number of interactions occurring over a given period of time. Blocks may be appended to a blockchain by an appropriate node after it completes the block and the block is validated. Each block can be associated with a block header. In embodiments of the invention, a blockchain may be distributed, and a copy of the blockchain may be maintained at each full node in a verification network. Any node within the verification network may subsequently use the blockchain to verify interactions.

A "block header" can be a header including information regarding a block. A block header can be used to identify a particular block of a blockchain. A block header can comprise any suitable information, such as a previous hash, a Merkle root, a timestamp, and a nonce. In some embodiments, a block header can also include a difficulty value.

A "nonce" can include an arbitrary number. In some embodiments, a nonce can be a value that can be adjusted by a full node while performing a proof-of-work process. A nonce can be input into a hash function along with block data to determine the output hash value. A correct nonce (also referred to as a golden nonce) yields an output hash value that satisfies a predetermined criteria, such as being less than a difficulty value. A nonce can be of any suitable length (e.g., 32-bits).

"Image data" can include any suitable data relating to an image. Image data can originate from or be associated with still pictures or from videos. In some embodiments, image data may be data representing an image of an object. Such image data can be obtained from a camera, telescope, microscope, or any other suitable device. Image data may be in any suitable form. For example, image data may include a number of pixels that may be arranged in a rectangular array and an intensity of a color (e.g., color data) for each pixel. Image data may be in the form of JPEG, PNG, DNG, GIF, BMP, SVG, etc. files. Image data may also include "image metadata."

"Image metadata" can include a set of data that that is associated with an image, but that is not the actual data that represents an image of an object. In some embodiments, image metadata can include details relevant to the image itself as well as information about its production. Image metadata, for example, can include technical data associated with an image of an object (e.g., camera details and settings such as aperture, shutter speed, ISO number, focal depth, dots per inch (DPI), camera brand, model, date and time, location data (e.g., GPS location), etc.), descriptions about an image (e.g., name of the image creator, keywords related to the image, captions, titles and comments, etc.), and/or administrative information about an image (e.g., usage and licensing rights, restrictions on reuse, contact information for the owner of the image, etc.).

"Image comparison data" can include data that is generated after comparing images. In some embodiments, Image comparison data can include differences and/or similarities between image data for different images (e.g., update image data and stored image data).

An "asset" can be something useful or valuable to an entity. Exemplary assets may include physical goods.

An "asset type" can include a category of an asset. An asset can correspond to an asset type. For example, an asset type can include vehicles, dwellings, equipment, study materials, land, etc.

A "proof of ownership" can include a document, certificate, title, deed, etc. that indicates a user as an owner of an asset. For example, a proof of ownership can include, but are not limited to, property deeds, recorder's office documents, deeds of trust, mortgage notes, satisfaction of mortgage letters, receipts, proof of purchase documents, bill of sales, and the like.

An "interaction" may include a reciprocal action or influence. An interaction can include a communication, contact, or exchange between parties, devices, and/or entities. Example interactions include a transaction between two parties and a data exchange between two devices. Interactions can also include agreements, smart contracts, and the like.

A "smart contract" can include a computer protocol intended to digitally facilitate, verify, and/or enforce the negotiation and/or performance of a contract. In some embodiments, a smart contract may include a contract between a first user and a second user and may have any suitable smart contract identifier. A smart contract can include partially or fully self-executing clauses. For example, a smart contract may indicate that a first user is allowing a second user to borrow the first user's tractor for 12 months in exchange for a portion of a crop yield at the end of the indicated period. The smart contract can also include any suitable clauses to enforce this contract. For example, the second user may be required to submit update image data of the tractor to a blockchain each month, such that the condition of the tractor can be tracked according to the smart contract. Each month, update image data can be processed and the smart contract can execute any suitable process dependent on the update image data.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "data processor" or "processor" may include any suitable data computation device or devices. A data processor may comprise one or more microprocessors working together to accomplish a desired function. The data processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Details of some embodiments of the present invention will now be described.

Embodiments of the invention allow for a verification network configured to process smart contracts as well as image data. A full node, which stores a blockchain, can receive image data from a second user device. The image data can include data associated with an asset of the second user (e.g., a plot of land, a tractor, a car, etc.). The full node can verify that the second user is in possession of the asset and/or is the proper owner of the asset. The full node can then add the image data to the blockchain maintained by the full node. The full node may, for example, create an entry that contains the image data in a block, which may contain other entries, and may store the block on the blockchain, and may further broadcast the block to other nodes in a network.

In embodiments of the invention, a first user can request access to a second user's asset. For example, the first user may make an interaction request to a second user to borrow the second user's tractor. A first user device operated by the first user can transmit, to a full node in a blockchain network, an asset request message comprising any suitable data (e.g., a requested asset type, etc.) to facilitate the interaction process. The full node can then determine whether or not the second user agrees to participate in the interaction with the first user. For example, the full node can transmit a message to the second user device asking whether or not the second user will participate in the interaction. If both the first and second users agree to participate, then the full node can generate a smart contract for the first and second users, and can store the smart contract on the blockchain. For example, the smart contract can indicate that the first user may borrow the second user's tractor for 10 months. The first user may also need to submit images of the borrowed tractor, in the form of update image data, every two months to the full node and other nodes in a verification network. In some embodiments, upon receiving the update image data (e.g., new image data associated with the tractor), a full node of the verification network can communicate with a plurality of computer devices adapted to process image data. The computer devices can analyze the update image data as well as any previously stored image data to determine image comparison data. The full node can then determine whether or not the image comparison data is consistent with the smart contract. The full node can also store the image comparison data as well as the update image data to the blockchain. The full node can communicate with the first user devices and/or the second user device to notify the users of updates to the smart contract (e.g., updates such as the inclusion of update image data to the blockchain).

FIG. 1 shows a block diagram of a system 100 comprising a number of components according to some embodiments of the invention. The system 100 comprises a first user device 102, a second user device 104, a plurality of full nodes 120 comprising a first full node 122, a second full node 124, and a third full node 126, as well as a plurality of computer devices 130 comprising a first computer device 132, a second computer device 134, and a third computer device 136.

The first user device 102 can be in operative communication with one or more than one full node of the plurality of full nodes 120. For example, the first user device 102 can be in operative communication with the first full node 122. The second user device 104 can be in operative communication with one or more than one full node of the plurality of full nodes 120. For example, the second user device 104 can be in operative communication with the second full node 124. In some embodiments, the first user device 102 and the second user device 104 may communicate with the same full node (e.g., the first full node 122).

The full nodes of the plurality of full nodes 120 can be in operative communication with one another. The first full node 122 can be in operative communication with both the second full node 124 and the third full node 126. Similarly, the second full node 124 may be in operative communication with the first full node 122 and the third full node 126.

Each of the full nodes of the plurality of full nodes 120 can be in operative communication with a plurality of computer devices 130. System 100 shows the plurality of computer devices 130 associated with the first full node 122, however, it is understood that the second full node 124 and the third full node 126 can be associated with a second plurality of computer devices and a third plurality of computer devices, respectively. The plurality of computer devices 130 can include any suitable number of computer devices which may be associated with one of the full nodes.

The system 100 illustrates the first full node 122 in operative communication with the first computer device 132. However, the first full node 122 may also be in operative communication with the second computer device 134 and/or the third computer device 136 as well. The first full node 122 may communicate directly with one, some, or all of the computer devices. In some embodiments, the first full node 122 may be operatively coupled to one or more computer devices.

For example, in some embodiments, the second full node 124 may be in operative communication with any suitable number of computer devices (e.g., 2, 4, 10, etc.). The third full node 126 may be in operative communication with any suitable number of different computer devices (e.g., 1, 5, 15, etc.).

Message between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The first user device 102 can include any suitable user device (e.g., mobile device, etc.) operated by a first user. The second user device 104 can include any suitable user device (e.g., laptop computer, etc.) operative by a second user. The first user device 102 and the second user device 104 can be configured to communicate with one or more full nodes. The first user device 102 and the second user device 104 can be configured to transmit image data to a full node. In some embodiments, the first user device 102 and the second user device 104 may be adapted to capture image data. For example, the first user device 102 may include an integrated camera configured to capture image data.

In some embodiments, the first user device 102 and the second user device 104 can be configured to register an asset to be borrowed by the first user from the second user with a full node along with image data associated with the asset. The first user can submit, via the first user device 102, update image data of the asset once the asset is received from the second user. The full node can then record the update image data as input to the smart contract.

The plurality of full nodes 120 including the first full node 122, the second full node 124, and the third full node 126 can be nodes in a verification network. The plurality of full nodes 120 can be configured to generate and store blocks on a blockchain. Each full node can be configured to store the blockchain in any suitable memory or database. For example, the first full node 122 can be in operative communication with a blockchain database, which may be a private database. The database may be a conventional, fault tolerant, relational, scalable, secure database such as Oracle™ or Sybase™. The database may be implemented using various data structures, such as an array, hash map, (linked) list, structured text file (e.g., XML), table, and/or the like. Such data structures may be stored in memory and/or in structured files.

In some embodiments, the plurality of full nodes 120 can be configured to generate a smart contract between an asset owner (e.g., a second user user) and a lendee (e.g., a first user). In some embodiments, the full node can be configured to validate the parties (i.e., the first and second users), asset ownership, etc. The plurality of full nodes 120 can be configured to provide the image data to the respective plurality of computer devices, which can act as a secondary blockchain network for each full node in some cases. The secondary blockchain network can execute a series of image processing algorithms which can compare asset source image data (i.e., the original and/or stored image data) and the update image data submitted to the verification network. Examples of image processing algorithms can include appearance based object recognition, model based object recognition, template based object recognition, part based object recognition, region based object recognition, and contour based object recognition.

The plurality of computer devices 130 including the first computer device 132, the second computer device 134, and the third computer device 136 can be configured to process image data. The plurality of computer devices 130 can be private devices in a private network which may communicate with a particular full node (e.g., the first full node 122). The private network of computer devices may or may not store a blockchain.

In some embodiments, if the computer devices store a secondary blockchain, one of the computer devices of the plurality of computer devices 130 can be a leader computer device (i.e., a leader node). The leader computer device of the secondary blockchain can validate the results from all of the computer devices and can then pass the result set to the full node to complete the smart contract processing.

Figure 2:
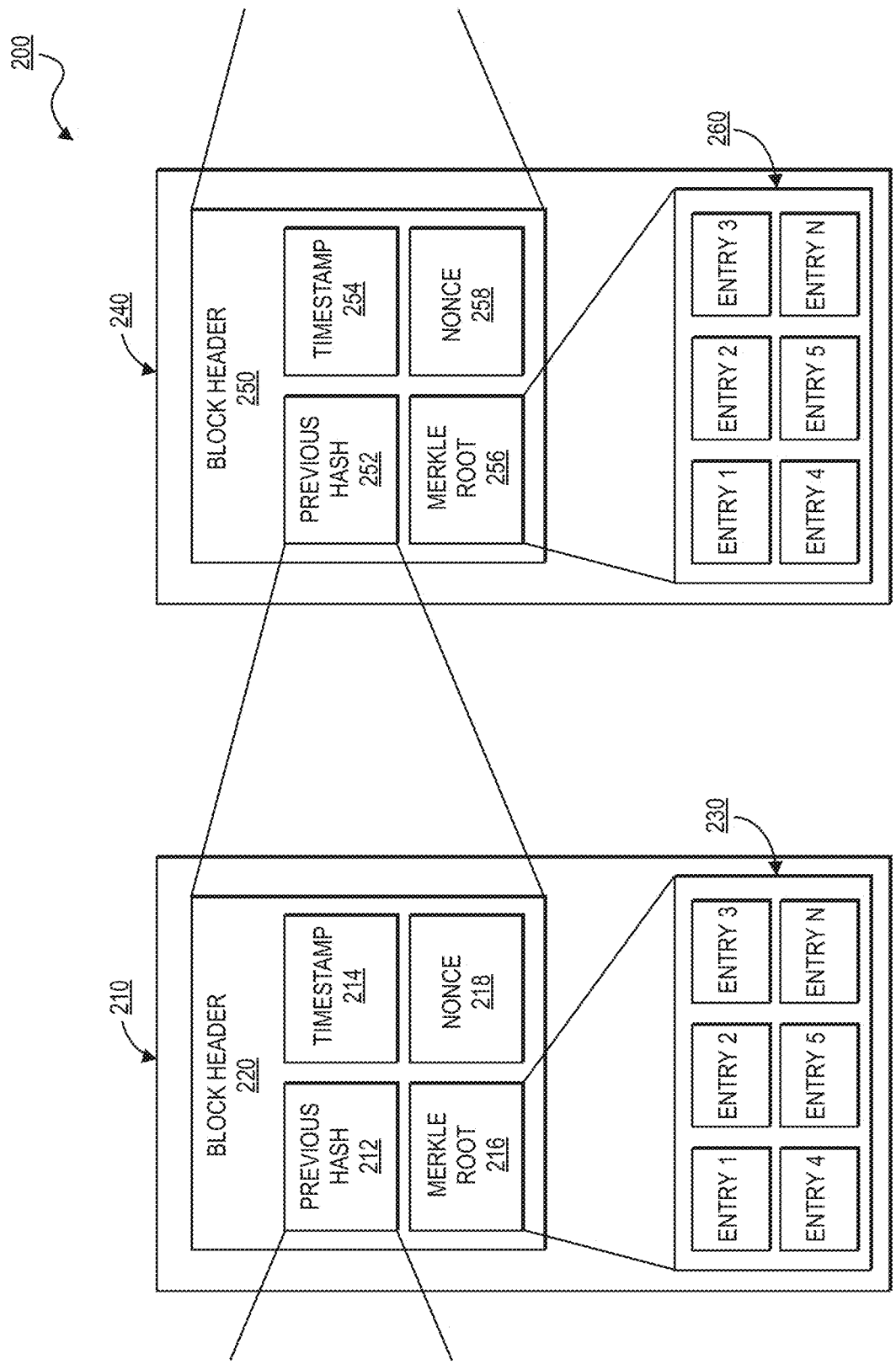
FIG. 2 shows a diagram of a blockchain according to embodiments of the present invention.

FIG. 2 shows a diagram of a blockchain according to embodiments of the present invention. FIG. 2 includes a blockchain 200 comprising a first block 210 and a second block 240. The blockchain 200 can include any suitable number of blocks (e.g., 10, 500, 2000, 500000, etc.).

Current blockchain technologies, such as Bitcoin and Ethereum, maintain an append-only ledger in a network. The ledger includes a list of blocks of transaction data, the blocks are cryptographically chained together. A block is created by a computationally intensive process called proof-of-work in which valid blocks need to demonstrate a sufficient "difficulty" (i.e., sufficient computation power to create on average). If there are more than one available chains of blocks, then network participants, i.e., nodes, can download all blocks in all chains and follow the chain which has the highest total difficulty. This mechanism guarantees that, in the long run, the network will agree on a single and valid chain, see [Garay et al, The Bitcoin backbone protocol: Analysis and applications. In *Advances in Cryptology—*

*EUROCRYPT* 2015, pages 281-310, 2015], [Bitcoin Website. http://www.bitcoin.org/], and [Rafael Pass, Lior Seeman, and Abhi Shelat. Analysis of the blockchain protocol in asynchronous networks. In Jean-Sébastien Coron and Jesper Buus Nielsen, editors, *Advances in Cryptology—EUROCRYPT* 2017, pages 643-673, Cham, 2017. Springer International Publishing.], which are all incorporated herein by reference for all purposes.

The blockchain 200 can create a history of data deposits, messages, or entries in a series of blocks where each block contains a mathematical summary, called a hash, of the previous block. This creates a chain where any changes made to a block will change that block's hash, which must be recomputed and stored in the next block. This changes the hash of the next block, which must also be recomputed and so on until the end of the chain.

Although the hash can be simple to compute, rules may be imposed, which require the value of the hash to be below a certain threshold value (i.e., a difficulty value). In addition, the hash is based on a type of mathematical function that is not reversible. One cannot predict what input can be used to produce the desired output. A valid hash is found by repeatedly adjusting a changeable value in the block, and recalculating the hash until it meets the validity requirements. The freely changeable value can be a nonce. The unpredictable nature of the hash considerably increases the difficulty of finding a nonce that produces a valid hash of the block.

As an example, the first block 210 can include a block header 220 and block entries 230. The block header 220 of the first block 210 can comprise a previous hash 212, a timestamp 214, a Merkle root 216, and a nonce 218.

The previous hash 212 can be a hash of the previous block's header. The previous hash 212 can be the result of a non-reversible mathematical computation using data from the previous block as the input. According to some embodiments, the computation used can include a SHA256 hash function. One of ordinary skill in the art would recognize that any suitable hash function could be used without departing from the spirit and scope of the present invention. The hash function can be designed so that any change to the data in the previous block results in an unpredictable change in the hash of that block. The previous hash 212 can be a link between blocks, chaining them together to form the blockchain 200.

When calculating the previous hash 212 for the previous block, a node can determine if the previous hash 212 can meet certain criteria defined by a difficulty value. In some embodiments, the difficulty value may include a number that the calculated hash must be less than. However, because the output of the hashing function is unpredictable, the output cannot be determined what input will result in an output that is less than the difficulty value before the hash is calculated. The nonce 218 can be used to vary the data content of the block, allowing for a large number of different outputs to be produced by the hash function in pursuit of an output that meets the difficulty value. This makes can make it computationally expensive to produce a valid block with a nonce 218 that produces a hash value meeting the criteria of the difficulty value.

The hash algorithms used for the previous hash 212 can include MD5, SHA-1, SHA-224, SHA-256, SHA-384, SHA-512, SHA-512/224, SHA-512/256, SHA-3 or any suitable hash function. There is also no requirement that a hash be computed only once. The results of a hash function may be reused as inputs into another or the same hash function again multiple times in order to produce a final result. One of ordinary skill in the art would recognize that any hash function could be used to compute the required hashing without departing from the spirit and scope of the present invention.

The Merkle root 216 can be a root of a Merkle tree, which can include a tree in which every leaf node is labelled with the hash of a data block, for example an entry. Each leaf of the Merkle tree can represent one of the entries. Each entry can be hashed together with a sibling node (i.e., entry) in the Merkle tree. Successively hashing sibling nodes in the Merkle tree can result in the Merkle root 216.

The block entries 230 can include image data and/or smart contracts. The block entries 230 can include any suitable number of entries. In some embodiments, the number of entries in the block entries 230 may be limited by the overall size of the block (e.g., the first block 210). For example, the blocks on the blockchain may be limited by a certain amount of data (e.g., ½ MB, 1 MB, 2 MB, 5 MB, 10 MB, etc.). In other embodiments, the number of entries in the block entries 230 may be a predetermined number of entries. For example, the nodes in the verification network can determine that 1, 10, 150, 500, 1000, etc. entries can be included in the block entries 230.

The timestamp 214 can include a time that the block was created within a certain range of error. According to some embodiments of the present invention, the full nodes of the verification network can check the timestamp 214 against their own known time and can reject any block that seems to have an erroneous timestamp 214.

The nonce 218 can be a value adjusted by a full node while performing a proof-of-work process, as described herein. A nonce can be input into a hash function along with block data to determine the output hash value. A correct nonce (also referred to as a golden nonce) yields an output hash value that satisfies a predetermined criteria, such as being less than a difficulty value.

The second block 240 can be similar to the first block 210. For example, the second block 240 can include a block header 250 and block entries 260. The block header 250 of the second block 240 can comprise a previous hash 252, a timestamp 254, a Merkle root 256, and a nonce 258. The block entries 260 can include image data as well as smart contracts, and can be similar to the block entries 230.

Figure 3:
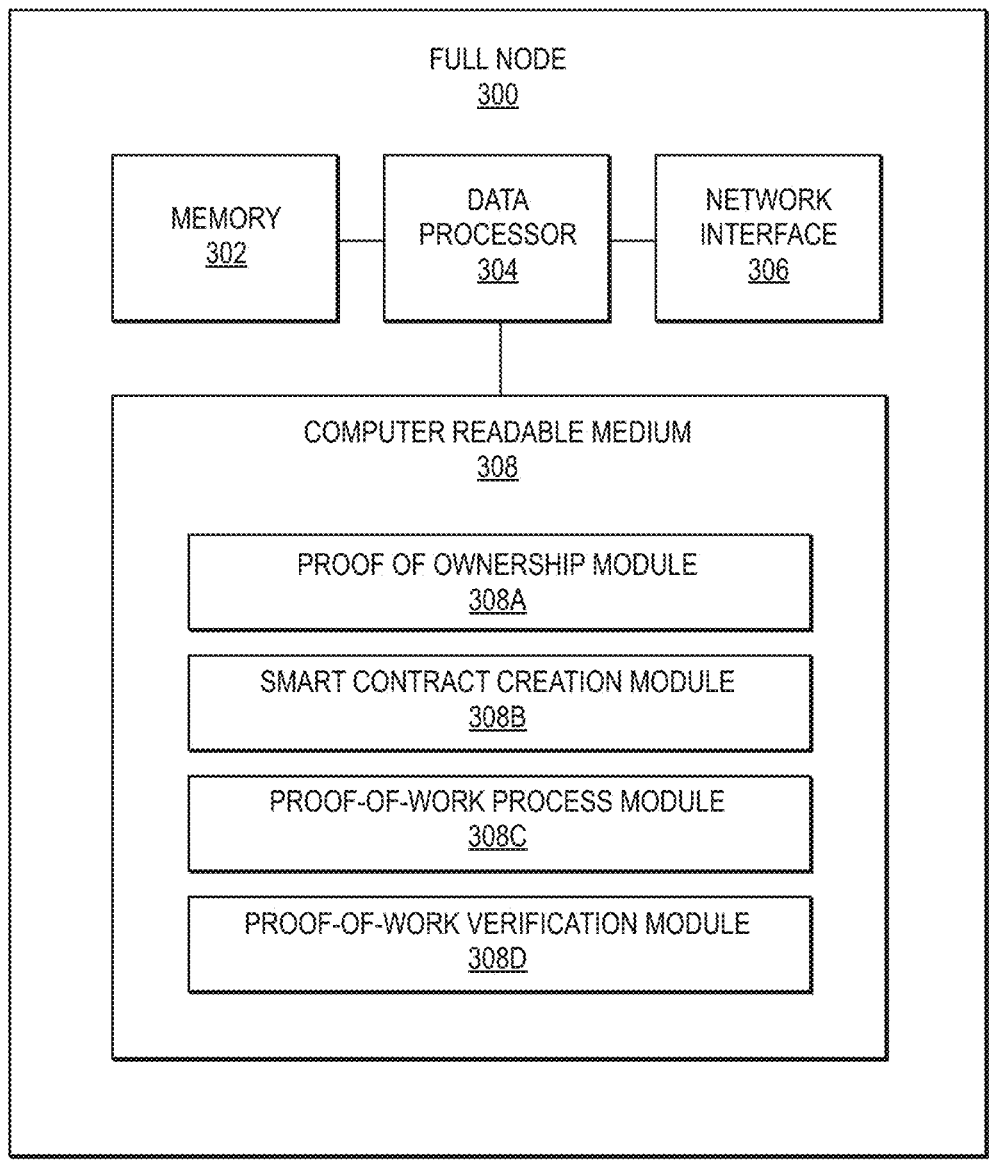
FIG. 3 shows a block diagram of a full node according to embodiments of the invention.

FIG. 3 shows a block diagram of a full node 300 according to some embodiments of the invention. The exemplary full node 300 may comprise a data processor 304. The data processor 304 may be coupled to a memory 302, a network interface 306, and a computer readable medium 308 comprising a proof of ownership module 308A, a smart contract creation module 308B, a proof-of-work process module 308C, and a proof-of-work verification module 308D.

The memory 302 may store routing tables, key identifiers, cryptographic keys, and/or any other relevant data securely. The memory 302 may be in the form of a secure element, a hardware security module, or any other suitable form of secure data storage.

The network interface 306 may include an interface that can allow the full node 300 to communicate with external computers. The network interface 306 may enable the full node 300 to communicate data to and from another device (e.g., other full nodes, computer devices, user devices, etc.). Some examples of the network interface 306 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 306 may include Wi-Fi™. Data transferred via the network interface 306 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 306 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 308 may comprise code, executable by the data processor 304, for implementing a method comprising: receiving, by a full node storing a blockchain, a message comprising update image data and a smart contract identifier from a first user device, the full node being one of a plurality of full nodes forming a blockchain network; determining, by the full node, stored image data associated with the smart contract identifier; determining, by the full node, whether or not image comparison data of the updated image data and the stored image data is consistent with a smart contract associated with the smart contract identifier; generating, by the full node, an entry for a block of the blockchain, comprising at least the smart contract identifier, the updated image data, and image comparison data; generating, by the full node, the block of the blockchain; transmitting, by the full node, the block to the plurality of full nodes, wherein the plurality of full nodes respectively verify the block; storing, by the full node, the block on the blockchain; and transmitting, by the full node, an indication of whether or not the block was stored on the blockchain to the first user device.

The proof of ownership module 308A, in conjunction with the data processor 304, can verify a proof of ownership received from a user. For example, the full node 300 may receive purchase documents from a user device registered with the verification network. The proof of ownership module 308A, in conjunction with the data processor 304, can analyze the purchase documents and determine whether or not information in the purchase documents corresponds with information in a user's account. The information in the purchase documents, or more generally in the proof of ownership, can include names, dates, physical addresses, purchase amounts, email addresses, registration numbers, other entities involved, identification numbers, document numbers, and/or the like.

In some embodiments, the proof of ownership module 308A, in conjunction with the data processor 304, can communicate with a remote computer which may store a database including proof of ownership information. For example, the proof of ownership module 308A, in conjunction with the data processor 304, can receive a title to an asset (e.g., a tractor) from the user. The proof of ownership module 308A can transmit the title, which may be encrypted with a cryptographic key, to the remote computer. Upon receiving the title, if applicable, the remote computer can decrypt the title with a corresponding cryptographic key. The remote computer can then analyze the title. For example, the remote computer can perform optical character recognition to determine information in the title (e.g., name, date, signatures, etc.). In some embodiments, the remote computer can compare the received title to previously stored titles to determine whether or not there is a match. If the received title matches a previously stored title, then the remote computer can determine that the proof of ownership is valid and/or authentic. The remote computer can respond to the full node 300 with information indicating whether or not the title is valid and/or authentic.

In some embodiments, the remote computer can analyze a pattern (e.g., watermark(s), security feature(s), etc.) on the title. For example, the title may include a watermark included in documents issued by a trusted entity (e.g., a bank, a government agency, etc.). The remote computer can determine that the pattern included in the title is accurate to known patterns.

In other embodiments, the proof of ownership module 308A, in conjunction with the data processor 304, can perform any of the processing of the remote computer described above. In yet other embodiments, the proof of ownership and/or data derived therefrom may be stored on the blockchain in an entry of a block as described in detail herein.

The smart contract creation module 308B, in conjunction with the data processor 304, can generate smart contracts. The smart contract creation module 308B can receive smart contract rules agreed upon by users (e.g., a first and second user). The smart contract rules can include any executable rules, for example, the smart contract can execute transfers when certain events occur (e.g., payment of security deposit in an escrow system, etc.). As another example, the smart contract rules can include rules related to results of image processing (e.g., notify user(s) if update image data does not match previously stored image data, etc.).

In some embodiments, the smart contract creation module 308B can create an address (i.e., a smart contract identifier) for a created smart contract. The smart contract identifier can allow for references to the smart contract as stored on a blockchain. Further information regarding smart contracts can be found in [Atzei, Nicola, et al. "SoK: unraveling Bitcoin smart contracts." *International Conference on Principles of Security and Trust*. Springer, Cham, 2018.] which is herein incorporated by reference in its entirety for all purposes.

The proof-of-work process module 308C, in conjunction with the data processor 304, can perform a proof-of-work process. A proof-of-work process can include performing a hash function on data. The hash function can take an input string of numbers and letters (e.g., data in a block) and can output a new string out of letters and numbers (i.e., a hash output). The proof-of-work process module 308C, in conjunction with the data processor 304, can compute data using the hash function any suitable number of times until the output of the hash function is less than a predetermined threshold. In some embodiments, the proof-of-work process module 308C, in conjunction with the data processor 304, can create a nonce, of any suitable value, and determine a hash output based on block data including the nonce. The proof-of-work process module 308C, in conjunction with the data processor 304, can then determine if the hash output is less than the difficulty value. If the hash value is not less than the difficulty value, then the proof-of-work process module 308C can determine a new nonce and can re-compute the hash function. The proof-of-work process module 308C, in conjunction with the data processor 304, can determine the new nonce in any suitable manner. For example, the proof-of-work process module 308C can iterate through a number of nonces sequentially.

The proof-of-work verification module 308D, in conjunction with the data processor 304, can verify if a proof-of-work process was performed correctly. The proof-of-work verification module 308D can, in conjunction with the data processor 304, verify signatures and blocks received from other full nodes. For example, the full node 300 can receive a signature and a block from another full node in the verification network. The proof-of-work verification module 308D can input the data of the block into the hash function. The proof-of-work verification module 308D can determine if the output of the hash function (i.e., signature) matches the received signature and if the received signature is less than a difficulty value.

Figure 4:
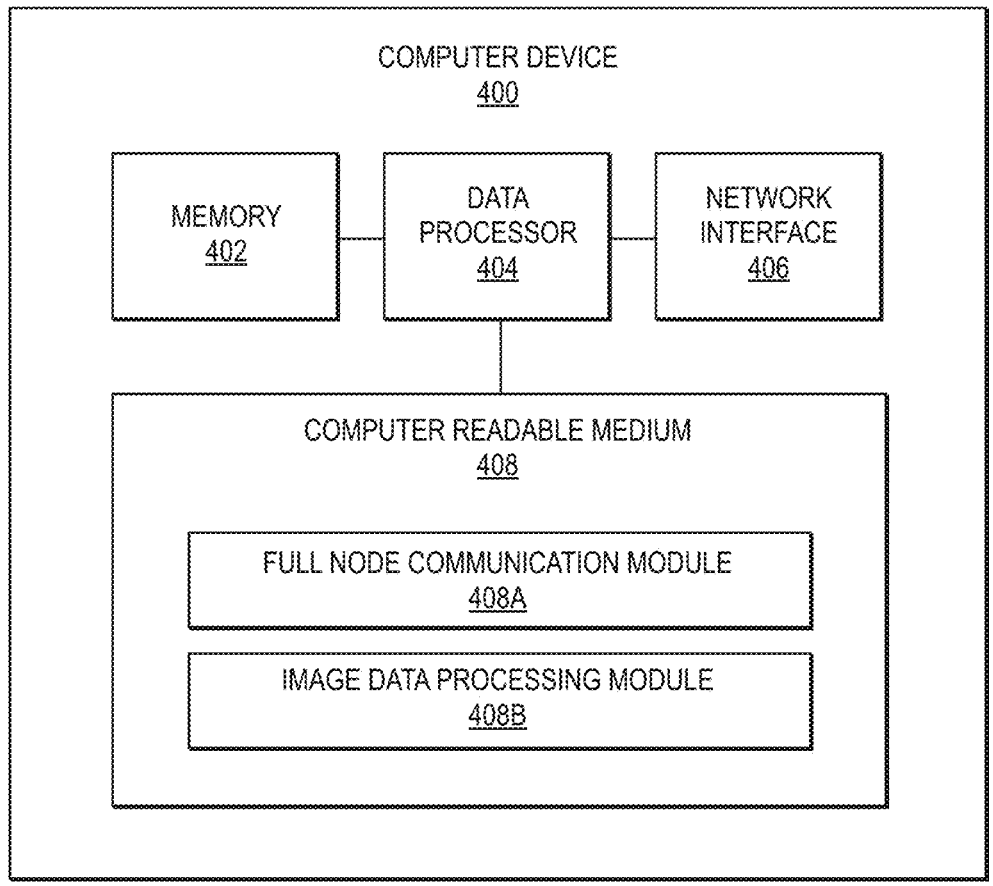
FIG. 4 shows a block diagram of a computer device according to embodiments of the invention.

FIG. 4 shows a block diagram of a computer device 400 according to some embodiments of the invention. The exemplary computer device 400 may comprise a data processor 404. The data processor 404 may be coupled to a memory 402, a network interface 406, and a computer readable medium 408 comprising a communication module 408A and an image data processing module 408B.

The memory 402 may store key identifiers, cryptographic keys, and/or any other relevant data securely. The memory 402 may be in the form of a secure element, a hardware security module, or any other suitable form of secure data storage. In some embodiments, the memory 402 may store image data. The network interface 406 may be similar to the network interface 306, described herein, and will not be repeated here.

The computer readable medium 408 may comprise code, executable by the data processor 404, for implementing methods as described herein. For example, in some embodiments, the method can include receiving update image data and stored image data from a full node; performing image analysis on the update image data and/or the stored image data yielding image comparison data; and providing the image comparison data to the full node. As another example, the method can include receiving update image data and a user identifier associated with the update image data; determining a block in the blockchain that comprises stored image data corresponding to at least the user identifier; performing image analysis on the update image data and/or the stored image data yielding image comparison data; storing the update image data and/or the image comparison data in a block on the blockchain; and providing the image comparison data to the full node.

The communication module 408A, in conjunction with the data processor 404, can generate messages, forward messages, reformat messages, and/or otherwise communicate with other entities. For example, communication module 408A can be used to facilitate communications between a full node and other computer devices.

The image data processing module 408B, in conjunction with the data processor 404, can process image data. In some embodiments, the computer device 400 can receive image data (e.g., stored image data, update image data, etc.) from a full node. In other embodiments, the computer device 400 can receive a smart contract identifier and/or a user identifier, along with update image data from a full node. The computer device 400 can then determine stored image data associated with the smart contract identifier in a blockchain stored by the computer device 400. In either case, the image data processing module 408B can then process the image data. For example, the image data processing module 408B can perform appearance based object recognition, model based object recognition, template based object recognition, part based object recognition, contour based object recognition, etc. in any suitable manner as known to one of ordinary skill in the art.

For example, a deep neural network may be previously trained using training data to determine whether or not a particular object (e.g., a car, a tractor, a cow, etc.) is included in an image. The image data processing module 408B, in conjunction with the data processor 404, can receive image data from a full node and then input the image data into the trained model to determine a classifier for the image data. For example, the image data processing module 408B, in conjunction with the data processor 404, can determine that the image includes a tractor. The output classifier (e.g., tractor) can be included in image result data and in image comparison data.

In some embodiments, the image data processing module 408B, in conjunction with the data processor 404, can process the image metadata included in the image data. For example, the image data processing module 408B can compare the GPS position recorded in the image metadata of stored image data to the GPS position recorded in the image metadata of update image data. The image data processing module 408B can determine a distance between the two GPS positions, determine if they are in the same county, state, country, etc., and/or any other suitable information regarding the GPS position.

In other embodiments, the image data processing module 408B can, in conjunction with the data processor 404, evaluate the color of an object (e.g., a tractor) in the image data, the object being determined by, for example, model based object recognition or other suitable method. The image data processing module 408B can compare the color of the tractor in first image data to the color of the tractor in the second image data. The image data processing module 408B can, in conjunction with the data processor 404, output any suitable information regarding the color comparison. For example, the image data processing module 408B can, in conjunction with the data processor 404, output an indication that the colors have a match score of 89%, the colors do not match (e.g., one tractor is blue, while the other tractor is red), the difference (i.e., distance) between two colors, etc.

As yet another example, the image data processing module 408B can compare two shapes included in both the stored image data and the update image data. For example, the image data processing module 408B can, in conjunction with the data processor 404, identify two circles in each instance of image data, where the circles may correspond to the tires on a tractor. The image data processing module 408B can, in conjunction with the data processor 404, compare the relative size of the two circles in stored image data to the relative size of the two circles in update image data. For example, if the tractor has a flat tire in one image and not the other, then the relative size of the two circles can be different in each instance of image data. As such, the image data processing module 408B can, in conjunction with the data processor 404, include the change in the relative size of the two circles (i.e., tires) in image comparison data which can be provided to the full node.

The image data processing module 408B can, in conjunction with the data processor 404, output image comparison data when performing image analysis on both stored image data and update image data. The image data processing module 408B can, in conjunction with the data processor 404, output image result data when performing image analysis on one image, however, it is understood that image comparison data can include any suitable image result data.

Figure 5:
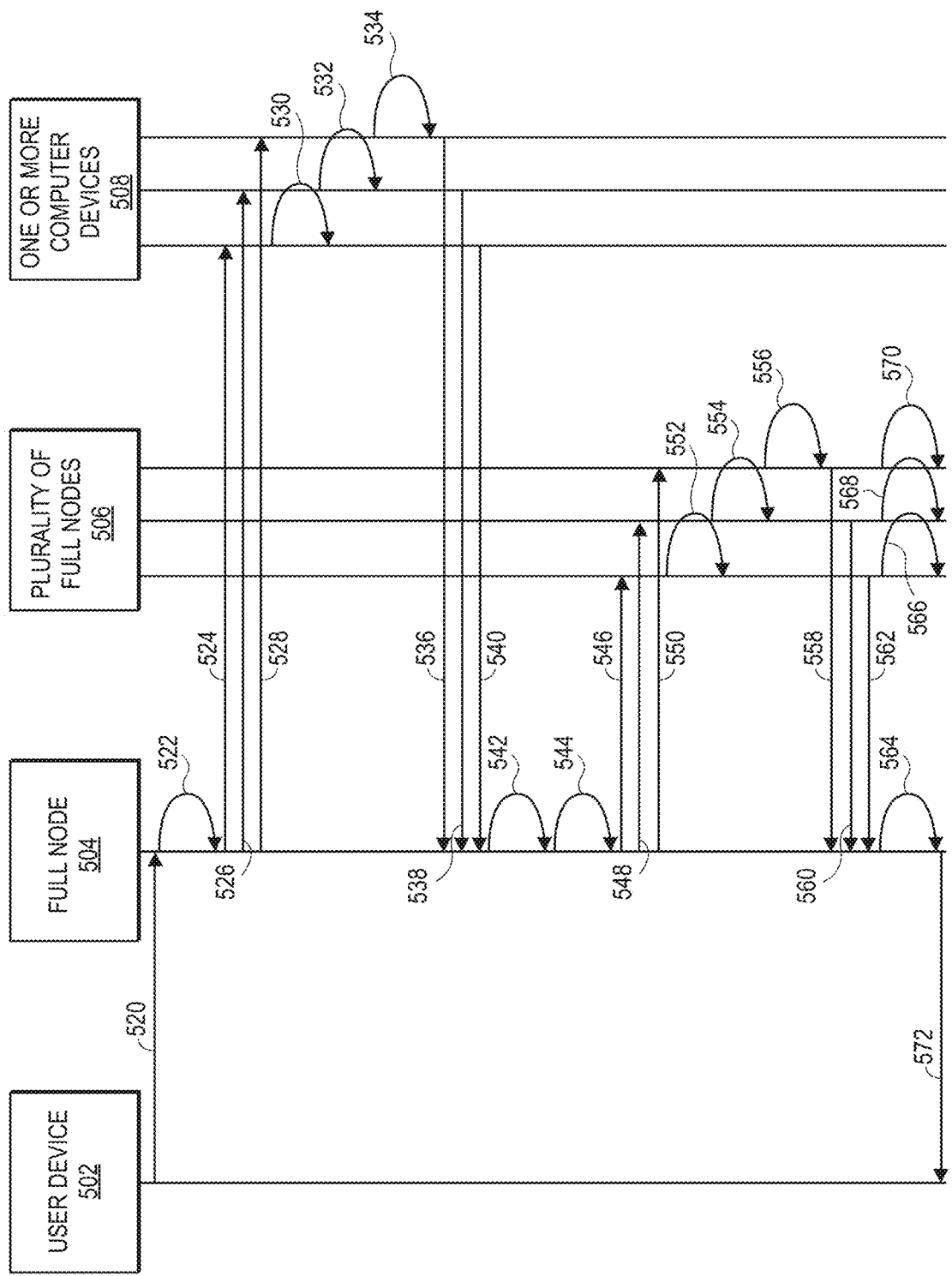
FIG. 5 shows a flow diagram illustrating an image entry creation process according to an embodiment of the invention.

FIG. 5 shows a process flow diagram of an image entry creation method according to an embodiment of the invention. The method illustrated in FIG. 5 will be described in the context of a user submitting an image of a tractor to a verification network. It is understood, however, that the invention can be applied to other circumstances (e.g., images of any suitable object, such as cars, agricultural equipment, plots of land, produce, household items, etc.). Although the steps are illustrated in a specific order, it is understood that embodiments of the invention may include methods that have the steps in different orders. In addition, steps may be omitted or added and may still be within embodiments of the invention.

Prior to step 520, a user of a user device 502 can take an image of the user's asset(s). For example, the user can take an image of a tractor using a camera integrated into the user device 502. In some embodiments, the user may also create an account (i.e., register) with a verification network comprising a number of full nodes. During registration, the user can create a user identifier, or in some embodiments, be assigned a user identifier by a full node (e.g., a full node 504). The user identifier can include any suitable alphanumeric identifier, such as "1234," "ABCDEF," "1hfd39Jf0," etc.

In some embodiments, the user can also obtain a proof of ownership of the asset. For example, the user can take a photo of a deed, a title, a license, etc. As another example, the user may obtain a digital file of the proof of ownership, which may be in any suitable format (e.g., a PDF file, etc.).

At step 520, the user device 502 can transmit image data of the user's asset to a full node 504. In some embodiments, the user device 502 can also transmit a proof of ownership of the asset to the full node 504. In some embodiments, the user device 502 can transmit image data corresponding to more than one image. For example, the image data can include image data associated with an image of a tractor as well as image data associated with an image of a plot of land. In some embodiments, the user device 502 can transmit video data to the full node 504, where the video data may be considered as a sequence of images.

In some embodiments, the user device 502 can further transmit an asset type associated with an asset portrayed in the image data to the full node 504. For example, the asset type may be a "tractor," a "cow," a "truck," a "bundle of hay," etc. In other embodiments, the full node 504 may automatically determine the asset type using image recognition and classification software.

At step 522, after receiving the image data and the proof of ownership, the full node 504 can verify the proof of ownership. The full node 504 can verify the proof of ownership using any suitable method. For example, the full node 504 can verify the authenticity of the proof of ownership, as described in further detail herein.

In some embodiments, after verifying the proof of ownership, the full node 504 can propagate the proof of ownership and the image data to the plurality of full nodes 506. The full node 504 can transmit the proof of ownership and the image data to one or more full nodes in the verification network. The full nodes that receive the proof of ownership can then perform steps 524-572 as described herein, however, it is understood that one of the full nodes can solve a proof-of-work process and create a block including at least the image data, then all of the full nodes can store the block, if verified, to the blockchain.

At steps 524, 526, and 528, if the full node 504 determines that the proof of ownership is valid, then the full node 504 can provide the image data to one or more computer devices 508. The full node 504 can provide the image data to the one or more computer devices 508 in any suitable manner, for example, the full node 504 can transmit the image data to the one or more computer devices 508 over a Wi-Fi communication channel. In some embodiments, the full node 504 may be operatively coupled to the one or more computer devices 508 and can provide the image data directly thereto.

In some embodiments, the full node 504 can provide the image data to a leader computer device of the one or more computer devices 508. The leader computer device can receive the image data from the full node 504 and can then provide the image data to any other computer devices of the one or more computer devices 508. The leader computer device may be predetermined to be the leader device by the full node 504. In some embodiments, the leader computer device can split the image data among the one or more computer devices 508. For example, the leader computer device can split the image data into portions (e.g., halves, thirds, fourths, etc.) and provide each portion of the image data to a different computer device. As another example, the leader computer device can split the image data into portions based on regions of the image (e.g., upper left quarter of the image, lower left quarter of the image, etc.).

After receiving the image data, the one or more computer devices can process the image data. For example, at step 530, a first computer device of the one or more computer devices 508 can process the image data. In some embodiments, the first computer device can perform one or more image processing algorithms. For example, the first computer device can perform appearance based object recognition as well as model based object recognition. At step 532, a second computer device of the one or more computer devices 508 can process the image data. For example, the second computer device can perform template based object recognition and part based object recognition. At step 534, a third computer device of the one or more computer devices 508 can process the image data. For example, the third computer device can perform contour based object recognition.

The computer devices can perform appearance based object recognition, model based object recognition, template based object recognition, part based object recognition, contour based object recognition, etc. in any suitable manner as known to one of skill in the art. For example, for further details on appearance based object recognition see [Roth, Peter M., and Martin Winter. "Survey of appearance-based methods for object recognition." *Inst. for Computer Graphics and Vision, Graz University of Technology, Austria, Technical Report ICGTR0108 (ICG-TR-01/08)* (2008)]. For further details on image processing see [Iyer, Natraj, et al. "Three-dimensional shape searching: state-of-the-art review and future trends." *Computer-Aided Design* 37.5 (2005): 509-530.] and [Russ, John C. *The image processing handbook*. CRC press, 2016.].

Each computer device can determine image result data resulting from the image processing of the image data. The image result data can include any suitable results of the image processing. For example, the image result data can include image metadata and/or determined data such as object(s), template(s), part(s), classifier(s), and the like. As an example, the image data can be associated with an image of a tractor. The image result data can include a focal length of "50 mm," a GPS location indicating the country of "India," a dots per inch (DPI) of "200 DPI," a date and time of "2019-02-11T20:30:56," a classifier of "tractor," a color of the tractor of "green," a determined tire width of "24 inches," a tractor model of "6145R," and any other suitable data.

At steps 536, 538, and 540, the one or more computer devices 508 can provide the image result data to the full node 504. In some embodiments, the one or more computer devices 508 can provide the image result data to the leader computer device. The leader computer device can then aggregate and provide the image result data from each computer device to the full node 504.

Although the use of one or more computer devices 508 is shown, it is understood that in other embodiments, a full node such as full node 504 could do the processing that is described with respect to the one or more computing devices 508 in other embodiments of the invention.

At step 542, after receiving the image result data, the full node 504 can determine whether or not the image result data is acceptable to add to a blockchain. For example, the full node 504 can determine whether or not the one or more computer devices 508 correctly determined the asset type of the image data (e.g., that the determined classifier matches the asset type supplied by the user device and/or the proof of ownership). The full node 504 can determine whether or not the one or more computer devices 508 determined that the image data represented the tractor. The image result data can be determined to be acceptable if the image result data fulfills one or more predetermined requirements, for example, more than X DPI, a correct classifier that matches the asset type, a GPS location, and/or any other suitable data requirements.

In some embodiments, the full node 504 can determine that the image result data is not acceptable, in which case, the full node 504 can transmit a resubmit image data request to the user device 502. For example, this may occur if the image data captured by the user device 502 includes a DPI less than a predetermined threshold (e.g., 100 DPI, 150 DPI, 250 DPI, etc.). The user device 502 can then prompt the user to submit a new clearer image. The user can proceed to take a new photo of the tractor. The user device 502 can transmit the new image data to the full node 504, which may process the new image data. This process may be similar to steps 520-542.

At step 544, after determining that the image result data is acceptable, the full node 504 can generate an entry for a block of the blockchain. The entry can include the image result data and/or the image data, and in some embodiments, the user identifier. The full node 504 can then generate the block of the blockchain. In some embodiments, the block can also include any suitable number of entries. For example, the full node 504 can aggregate entries and attempt to solve a proof-of-work process.

More specifically, the full node 504 can input the data of the block (e.g., the block header, the entries, etc.) into the hash function. When this input is hashed, it can result in a hash output (32 digit string). The full node 504 can compare the hash output to a predetermined criteria. The predetermined criteria can indicate that the hash output needs to start with a certain amount of zero's in order to be valid. The full node 504 can change the nonce in the block in order to change the hash output. The full node 504 can compute the hash output while varying the nonce until the hash output satisfies the predetermined criteria (i.e., has less than X leading zeros). In some embodiments, the output hash can be referred to as a signature.

In some embodiments, each entry included in the block can be hashed. Then, a hashed entry can be hashed together with another hashed entry. The full node 504 can construct a Merkle tree with the entries by a hashing process, and may determine a Merkle root, as known to one of ordinary skill in the art. In some embodiments, each entry can include the image data including image metadata. The full node 504 can hash the image result data and the image data including the image metadata, and subsequently, hash the hashed image data with other hashed image data in the block until the full node 504 determines the Merkle root. In other embodiments, the full node 504 can hash the image metadata in each entry to determine the Merkle root, where the image data can be stored in relation to the hashed image metadata. In yet other embodiments, the full node 504 can hash a portion of the image data (e.g., half of the image data, a random distribution of pixels of the image data, a portion representing the asset, etc.).

In other embodiments, the verification network may be a private network, where each full node is completely trusted. Each full node may be capable of generating and then storing a block on the blockchain before each of the other nodes verifies the block. Since, in this embodiment, each node is trusted, a node in the verification network does not need to verify the blocks created by other nodes. In some embodiments, the full node may not perform the proof-of-work process to create the block. Rather, the full node can hash the block without a nonce and determine an output hash (i.e., signature) for the block. The output hash may not need to be less than a difficulty value, or satisfy any other suitable criteria. The full node can then broadcast the block and the hash value for the block to the verification network, where the receiving full nodes can store the block in the blockchain.

At steps 546, 548, and 550, the full node 504 can transmit the block and the signature to a plurality of full nodes 506 of the verification network. At steps 552, 554, and 556, the plurality of full nodes 506 can verify the block and the signature by taking the data of the broadcasted block, and hashing it to determine if the output hash indeed matches the included signature. If the signature is valid, the plurality of full nodes 506 can determine that the block can be added to the blockchain (e.g., the full nodes can reach consensus).

In some embodiments, at steps 558, 560, and 562, the plurality of full nodes 506 can transmit a response to the full node 504 regarding whether or not the block is verified. For example, a first full node of the plurality of full nodes 506 can transmit a message to the full node 504 including an indication that the block and the signature are valid and that the first full node has determined to add the block to the blockchain. In some embodiments, the response can further include any suitable information (e.g., full node identifiers, etc.).

At steps 564, 566, 568, and 570, the full node 504 and the plurality of full nodes 506 can store the block on the blockchain. Each full node can store the block on the blockchain after verifying the block (i.e., verifying that the proof-of-work process was performed correctly). The blockchain can be stored in any suitable memory or database by each full node as described herein.

At step 572, after adding the block to the blockchain, the full node 504 can notify the user device 502 of success or failure. For example, the full node 504 can transmit an indication of whether or not the block was stored on the blockchain to the user device 502.

Figure 6:
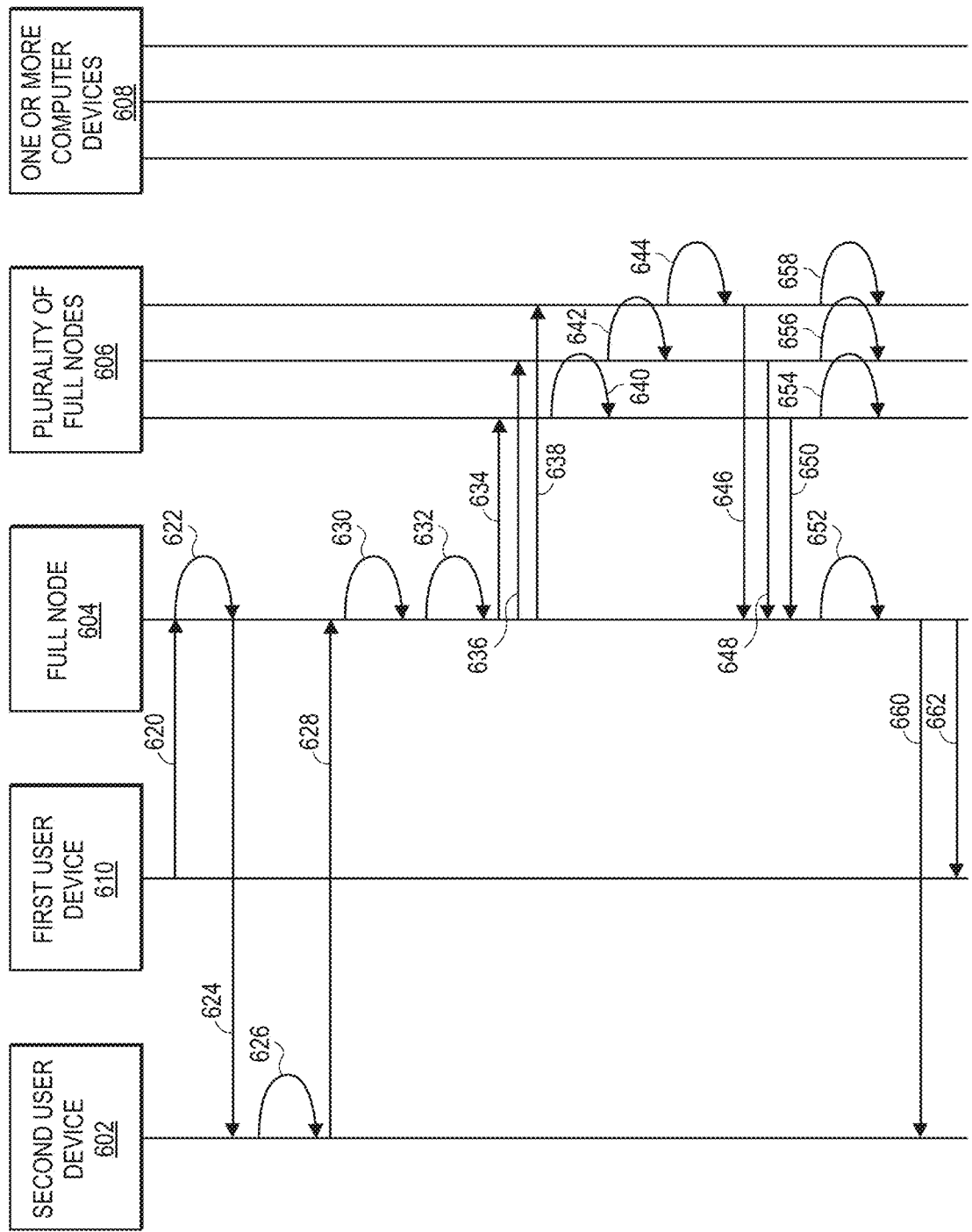
FIG. 6 shows a flow diagram illustrating a smart contract generation process according to an embodiment of the invention.

FIG. 6 shows a process flow diagram of a smart contract generation method according to an embodiment of the invention. The method illustrated in FIG. 6 will be described in the context of a first user requesting an asset (e.g., a tractor) from a second user. It is understood, however, that the invention can be applied to other circumstances including a request for any suitable asset. Although the steps are illustrated in a specific order, it is understood that embodiments of the invention may include methods that have the steps in different orders. In addition, steps may be omitted or added and may still be within embodiments of the invention.

Prior to step 620, a second user device 602 can submit image data of an asset to the verification network as described in FIG. 5. For example, an asset of asset type "tractor" can be added to the blockchain.

At step 620, the first user device 610 can transmit an asset request message to a full node 604. The asset request message can include an asset type and a first user identifier (e.g., a phone number, an IP address, a public key of the user, e-mail address, account number, account token, etc.). The asset request message may also include other information such as a current date and time, and any proposed conditions of use of the asset (e.g., a request to use the asset for a specific period of time, and for less than a specific dollar amount). For example, the first user can request an asset of the asset type "tractor" and may request that the tractor be rented for a period of one year and for less than $5,000 for the year. In some embodiments, the full node 604 may be the same or different than the full node 504 described in FIG. 5.

At step 622, after receiving the asset request message from the first user device 610, the full node 604 can determine an entry in a block of the blockchain that describes an asset corresponding to the asset type and attributes (e.g., a specific price, model, age, etc.) that may satisfy the conditions specified by the first user of the first user device 610. For example, the full node 604 can search through the blockchain to determine an entry associated with the asset type of tractor. The full node 604 can also determine a second user identifier included in the entry, as well as any corresponding attributes (e.g., rentable for 2 years or less, for a fee of $4000 per year or more, the age of the tractor being 2 years old, etc.).

At step 624, the full node 604 can determine a second user device 602 corresponding with the second user identifier (e.g., a phone number, an IP address, a public key of the user, e-mail address, account number, account token, etc.). The full node 604 may store information linking the second user identifier to the second user device 602. The full node 604 can then generate and transmit a contract request message to the second user device 602. The contract request message can comprise at least a description of the asset corresponding to the asset type, the first user identifier, and optionally the second user identifier.

In some embodiments, the contract request message can further include contract details (i.e., smart contract rules) regarding a contract between the first user and the second user. The contract details may be received from the first user device 610 at step 620. In other embodiments, the contract details may be generated by the full node 604 as default contract details, which either the first user or the second user can request to alter. As an example, the smart contract rules may specific activities such as when the second user will deliver the tractor to the first user, when and how the first user will make payment for the tractor, schedules for periodic recording of updated image data relating to the tractor to the blockchain, when and how the tractor will be returned, etc.

At step 626, after receiving the contract request message, the second user device 602 can prompt the second user to respond to the request. In some embodiments, the second user may communicate with the first user to determine contract details in any suitable manner. For example, the second user device 602 may be in operative communication with the first user device 610. The first user device 610 and the second user device 602 may receive and transmit message to and from one another. In some embodiments, the full node 604 may act as an intermediary between the first user device 610 and the second user device 602 by routing messages from one user device to the other.

At step 628, the second user device 602 can generate and transmit a contract response message to the full node 604. The contract response message can indicate whether or not to create the smart contract. In some embodiments, the contract response message can comprise contract details, which may be the default contract details or contract details as agreed upon by the first and second users. The contract response message may further comprise username(s), public key(s), device identifier(s), IP address(es), and/or the like. In some embodiments, the full node 604 can receive a contract response message from both the first user device 610 and/or the second user device 602 and can compare the contract details included in both to determine if an agreement has been made.

At step 630, after receiving the contract response message from the second user device 602, the full node 604 can generate a smart contract. The full node 604 can generate the smart contract in any suitable method as known to one of skill in the art. For example, the agreed upon contract details may include the first user borrowing the second user's tractor for 2 years. The first user may need to submit images of the tractor every 6 months in order to continue using the tractor. The second user may be alerted, by a full node in the verification network, if update image data (supplied from the first user) indicates that the tractor has been damaged. In such a case, the smart contract may be terminated and the tractor and appropriate compensation be supplied to the second user. The smart contract can include any suitable partially or fully self-executing clauses.

At step 632, after generating the smart contract, the full node 604 can generate a block including the smart contract as an entry. The block can also include other entries including smart contracts and/or image data. The full node 604 can then perform a proof of work process as described herein. Step 632 may be similar to steps 542 and 544 described herein. At steps 634, 636, and 638, after solving the proof-of-work process, the full node 604 can transmit the block to the plurality of full nodes 606.

At steps 640, 642, and 644, the plurality of full nodes 606 can verify the proof of work. Steps 640, 642, and 644 may be similar to steps 552-556 described herein. At steps 646, 648, and 650, the plurality of full nodes 606 can transmit responses to the full node 604 indicating that the block was verified, or not verified.

At step 652, the full node 604 can store the block on the blockchain. At steps 654, 656, and 658, the plurality of full nodes 606 can store the block on the blockchain. Steps 654, 656, and 658 can be similar to steps 564-570 described herein.

At step 660, after storing the block on the blockchain, the full node 604 can notify the second user device 602 of whether or not the block was added to the blockchain. For example, the second user device 602 can generate and transmit a notification including a statement of "smart contract XYZ was successfully added to the blockchain in block X." The notification can include any statement regarding whether or not the block was added to the blockchain. At step 662, the full node 604 can also notify the first user device 610 of whether or not the block was added to the blockchain. The full node 604 may transmit the same notification to the first user device 610 and the second user device 602.

Figure 7B:
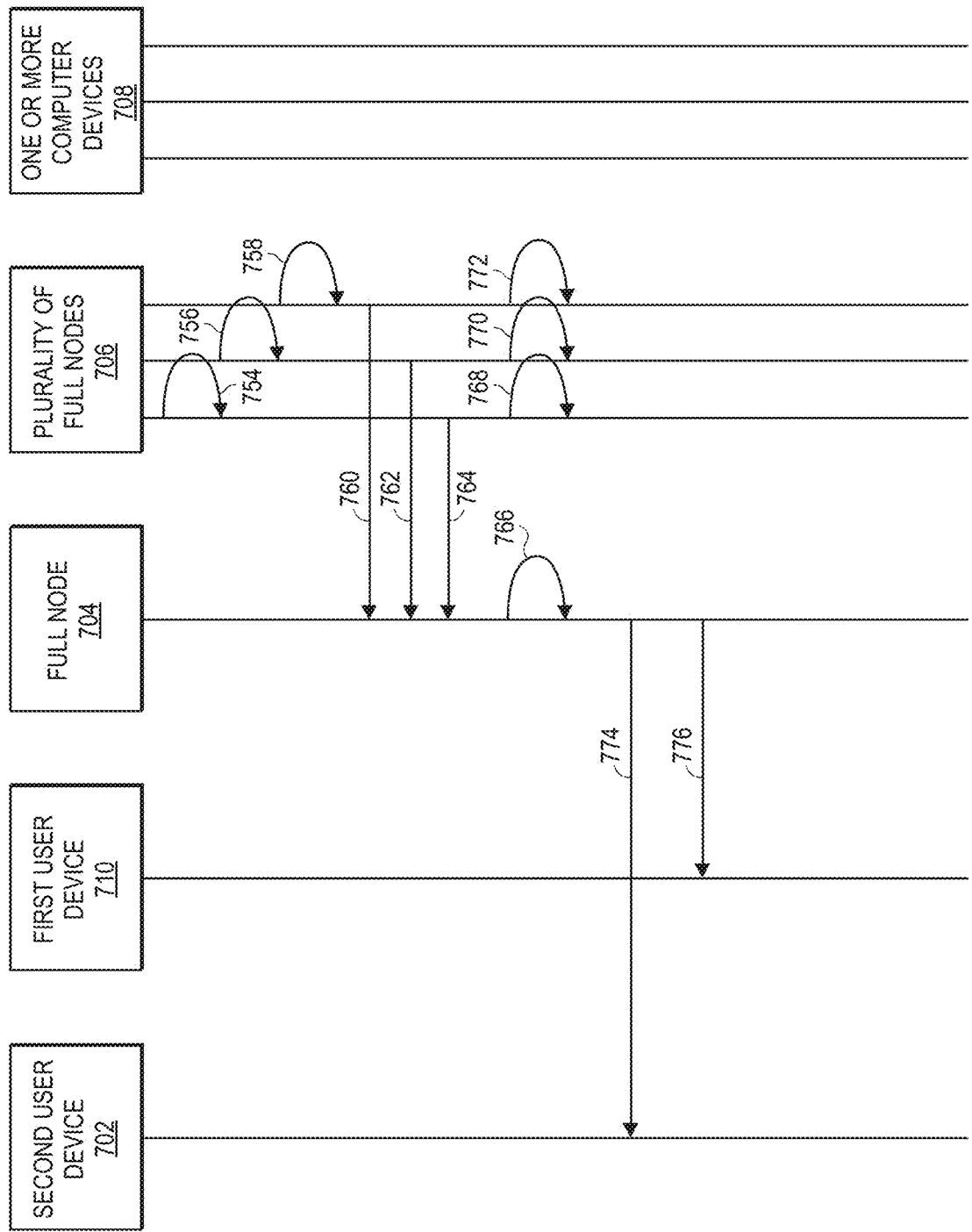

FIGS. 7A-7B show a process flow diagram of an update image data method according to an embodiment of the invention. The method illustrated in FIGS. 7A and 7B will be described in the context of a first user submitting update image data of a borrowed tractor to a verification network.

It is understood, however, that the invention can be applied to other circumstances including a second user submitting update image data related to a previously created smart contract. Although the steps are illustrated in a specific order, it is understood that embodiments of the invention may include methods that have the steps in different orders. In addition, steps may be omitted or added and may still be within embodiments of the invention.

Prior to step 720 in FIG. 7A, a first user of a first user device 710 can request an asset, such as a tractor, from a second user of a second user device 702 (e.g., as described in FIG. 6). A smart contract, created between the users, can indicate that the first user needs to provide update image data to the verification network after a defined regular interval. The first user can provide the update image data, via the first user device 710, to any suitable full node in the verification network. At step 720, the second user device 702 can transmit a message comprising update image data and a smart contract identifier to the full node 704. The message may also include a digital signature by the first user device 710 as well as a first user identifier of the first user of the first user device 710.

In some embodiments, the first user device 710 can provide the message to more the plurality of full nodes 706. The first user device 710 can provide the message to any suitable number of full nodes.

In other embodiments, after receiving the message comprising the update image data and the smart contract identifier, the full node 704 can broadcast the message to the plurality of full nodes 706 of the verification network. Each full node can then perform steps 722-746, wherein one of the full nodes can determine a correct nonce to a proof-of-work process at step 746.

At step 722, after receiving the update image data and the smart contract identifier, the full node 704 can determine stored image data associated with the smart contract identifier. For example, the full node 704 can search the blockchain, in any suitable manner know to one of skill in the art, to determine an entry in the blockchain associated with the smart contract identifier. The entry can include the stored image data. In some embodiments, the entry may include the smart contract.

At steps 724, 726, and 728, after determining the stored image data, the full node 704 can provide the stored image data and the update image data to one or more computer devices 708. At step 730, a first computer device of the one or more computer devices 708 can compare a color of an object in the update image data (e.g., a tractor, a car, etc.) to the color of the object in the stored image data. For example, the color of the object in the stored image data may be included in the stored image data from previous image processing (e.g., at steps 530-534 in FIG. 5). The first computer device can determine a match score between the color of the object in both instances of image data. For example, the match score can be "40%," "match," "no match," "95%," or any other suitable match score. The match score can be include in the image comparison data determined by the first computer device.

In some embodiments, the first computer device can determine whether or not the asset (e.g., tractor) has been damaged by comparing the stored image data to the update image data. For example, in regards to the color comparison above, the first computer device can further determine whether or not the paint on the tractor has been scratched, which may be indicative of further damage. The color of the tractor, for example, may have silver streaks through the green color of the tractor in a localized portion of the update image data (e.g., in the portion of the update image data corresponding to the side of the tractor, etc.), thus indicating scratches.

The first computer device can further determine whether or not the asset has been damaged by searching for differences in the structure of the asset in the update image data and the stored image data. For example, the structure of the tractor may change between the update image data and the stored image data if the tractor has been dented and/or otherwise damaged.

At step 732, a second computer device of the one or more computer devices 708 can perform image processing on the stored image data and the update image data. For example, the second computer device can compared a GPS location in the image metadata of the stored image data to a GPS location in the image metadata of the update image data. The second computer device can determine a difference between the two GPS locations, which may be included in the image comparison data. The second computer device can also perform additional image processing. For example, the second computer device can determine if a tractor included in both the stored image data and the update image data is the same tractor. The stored image data may include data regarding various shapes of parts of the tractor (e.g., shape of the tires, headlights, plow, cab, etc.). The second computer device can perform the same image processing techniques used to determine the various shapes of parts of the tractor, as described herein. The second computer device can then compare the various shapes of parts of the tractor from both instances of image data to determine if there are substantial differences (i.e., more or less than a threshold amount of difference). The resulting image comparison data can include any suitable data related to the analysis (e.g., difference in part size, an indication of whether or not the tractors match, an indication of any damage to the tractor over time, etc.).

At step 734, a third computer device of the one or more computer devices 708 can perform image processing on the stored image data and the update image data. For example, the third computer device can determine whether or not the update image data has been falsified. For example, the third computer device can determine if there are repeating pixels present in the image data. The third computer device can determine that there is a high concentration of pixels with the same value within a certain area in the image data (e.g., 70 pixels within a 100 pixel square having a same intensity value). The third computer device can determine that the image has a high probability of being edited (i.e., falsified) if the number of repeating pixels is higher than a predetermined threshold. The third computer device can further determine whether or not the update image data has been falsified using any suitable image processing techniques as known to one of skill in the art.

Further embodiments can include the one or more computer devices 708 mapping and validating the image data in the secondary blockchain (i.e., a blockchain stored by the one or more computer devices 708) against the stored image data of the asset (i.e., template/benchmark image data).

In some embodiments, rather than determining the stored image data and providing the stored image data to the one or more computer devices 708, the full node 704 may provide the smart contract identifier to the one or more computer devices 708. The one or more computer devices 708 may store a blockchain comprising blocks that can include entries associated with image data. The one or more computer devices 708 can add any suitable image data to the blockchain (e.g., update image data, image comparison data, image result data, etc.).

Other embodiments can include the one or more computer devices 708 mapping and validating portions of image data in the secondary blockchain so that each computer device can process part of the image. There may be a leader computer device, as described herein, which can validate and/or synchronize the portions of image data as well as provide the image comparison data to the full node 704 of the primary blockchain.

In other embodiments, the one or more computer devices 708 can perform different algorithms. The resulting image comparison data can be used to drive consensus among the nodes of the primary blockchain (e.g., the plurality of full nodes 706 and the full node 704).

For example, the full node 704 can split image data into 4 data packets comprising a portion of the image data. For example, the full node 704 can split the image data based on portions of the image, such as an upper left, lower left, upper right, and lower right portions of the image corresponding to the image data. The full node 704 can provide a portion of image data to each computer device, for example, four computer devices. These four computer devices can may have the visibility of the complete image data but can process their own portion of the image data. Each computer node can provide the image comparison data to the full node 704 so that consensus on the image data can be established between the plurality of full nodes. Image processing/validation can be run in parallel to the smart contract processing, by the plurality of full nodes 706, and hence may speed up the processing of the smart contracts.

At steps 736, 738, and 740, the one or more computer devices 708 can provide the image comparison data to the full node 704. At step 742, after receiving the image comparison data, the full node 704 can determine whether or not the image comparison data is consistent with a smart contract associated with the smart contract identifier. The full node 704 can evaluate any suitable clauses included in the smart contract. For example, the full node 704 can evaluate a clause in the smart contract that indicates that a color of a tractor borrowed by the first user should be the same in the two images. The full node 704 can evaluate the image comparison data to determine whether or not the colors of the tractor indicated in the image comparison data is consistent with the smart contract. The image comparison data can include data that indicates that the color of the tractor in the stored image data and the update image data matches by 92%. The smart contract may indicate that the color difference should be no less than 80% (or other suitable predetermined threshold). The image comparison data can be consistent with the smart contract if the image comparison data satisfies one or more predetermined clauses included in the smart contract. The full node 704 can evaluate any suitable number of clauses.

Although the use of one or more computer devices 708 is shown, it is understood that in other embodiments, a full node such as full node 704 could do the processing that is described with respect to the one or more computing devices 508 in other embodiments of the invention.

In some embodiments, at step 744, the full node 704 can generate an entry for a block of the blockchain, comprising at least the smart contract identifier, the updated image data, and image comparison data. At step 746, the full node 704 can generate the block of the blockchain. and can perform the proof of work process, as described in detail herein.

At steps 748, 750, and 752, after solving the proof-of-work process, the full node 704 can transmit the block to the plurality of full nodes. At steps 754, 756, and 758 in FIG. 7B, the plurality of full nodes 706 can verify the block, as described in detail herein.

At steps 760, 762, and 764, the plurality of full nodes 706 can transmit a notification of whether or not the block is verified. At steps 766, 768, 770, and 772, if the block is verified, then the full node 704 as well as the plurality of full nodes 706 can store the block on the blockchain.

At step 774, after storing the block on the blockchain, the full node 704 can notify the second user device 702 on whether or not the block was stored on the blockchain. At step 776, the full node 704 can notify a first user device 710 on whether or not the block was stored on the blockchain. The notification can include any suitable notification described herein.

Embodiments of the invention have a number of advantages. For example, embodiments allow for a system capable of processing image data in relation to smart contracts stored on a blockchain. For example, the full nodes of the system can execute clauses of a smart contract based on image data processed by computer devices.

Embodiments of the invention provided for a number of additional advantages. For example, in some embodiments, image metadata and/or a portion of the image data may be stored on the blockchain and processed, rather than the full image data, thus limiting the amount of data stored while preserving information about the image data necessary for a particular smart contract. For example, as noted above the comparison of stored image data to received image data could include the comparison of image metadata (e.g., the time and place of the image, the type of camera used to take the pictures of the images, and the overall contours of the assets in the images) about the stored and received image data rather than computationally intensive comparisons of data representing images of assets (e.g., the actual pixels making up the images of the assets).

Embodiments of the invention provided for yet a number of additional advantages. For example, embodiments of the invention can use different computer devices to process different aspects of image data, thereby ensuring that the processing of image data in a blockchain environment is rapid. Further, each computer device associated with a full node may perform a different image processing technique in some embodiments. In this way, the image data can be processed in parallel among the computer devices to reduce the total processing time in comparison to each computer device performing all of the image processing techniques.

Further, embodiments of the invention provide for an advantage of a verification network that can relate smart contracts to image data, which can allow users to visual keep track of borrowed/lent assets. The verification network can store update data received from user in a blockchain along with the smart contracts, thus creating an immutable record of both the smart contract as well as the status of the asset(s). This can be useful in case there is a dispute about the condition of the asset. For example, a tractor may be borrowed by a first user from a second user, and the second user, upon return of the tractor, may notice that the tractor was damaged. The first user, however, may have submitted an image of the tractor to the blockchain just prior to turning the tractor over to a shipping company to ship the tractor back to the second user. The submitted image may be an immutable record and may show that the tractor was undamaged when it was released by the first user to the shipping company. This image on the blockchain allows the second user to determine that the first user was not responsible for the damage to the tractor, and that the shipping company was likely responsible for the damage to the tractor.

Embodiments of the invention provided for a number of additional advantages. For example, in some embodiments, the image data may be stored on a blockchain or database by the one or more computer devices associated with a full node. A primary blockchain (stored by the full nodes) can include entries regarding the smart contract, whereas a secondary blockchain (stored by the one or more computer devices) can include entries regarding the image data.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
    receiving, by a full node storing a blockchain, an asset request message comprising an asset type associated with an asset and a first user identifier from a first user device operated by a first user;
    determining, by the full node, an entry in the blockchain associated with the asset type, wherein the entry includes at least a second user identifier;
    transmitting, by the full node to a second user device associated with the second user identifier and operated by a second user, a contract request message comprising the asset type and the first user identifier;
    receiving, by the full node from the second user device, a contract response message indicating whether or not to create a smart contract;
    if the contract response message indicates to create the smart contract, generating, by the full node, the smart contract including at least the first user identifier, the second user identifier, the asset type, and a smart contract identifier;
    generating, by the full node, a new entry for a block of the blockchain, comprising at least the smart contract;
    generating, by the full node, the block of the blockchain;
    transmitting, by the full node, the block to a plurality of full nodes, wherein the plurality of full nodes respectively verify the block;
    storing, by the full node, the block on the blockchain; and
    transmitting, by the full node, an indication of whether or not the block was stored on the blockchain to the first user device and the second user device.

2. The method of claim 1, wherein the new entry for the block of the blockchain further includes image data associated with the asset type, wherein the image data originated from the second user device.

3. The method of claim 1, wherein the first user identifier is a first public key associated with the first user device, and the second user identifier is a second public key associated with the second user device.

4. The method of claim 1, wherein the first user device is a first mobile phone, and the second user device is a second mobile phone.

5. The method of claim 1, wherein the asset request message further comprises a current time and date, and proposed conditions for use of the asset.

6. The method of claim 1, wherein the asset request message further comprises a current time and date, and proposed conditions for use of the asset, wherein the proposed conditions require the first user of the first user device to submit images of the asset periodically over a term of the smart contract.

7. The method of claim 1, further comprising:
    receiving, by the full node, image data for the asset; and
    storing, by the full node, the image data for the asset on the blockchain.

8. The method of claim 7, wherein the image data comprises location data, color data, contour data, template data, model data, and/or or appearance data.

9. The method of claim 1, wherein the block comprises a block header including a hash of a previous block of the blockchain, a timestamp, a nonce, and a Merkle root.

10. The method of claim 1, wherein the plurality of full nodes respectively verify the block by verifying a proof of work associated with the block.

11. The method of claim 1, wherein the full node and the plurality of full nodes are computers in a distributed network.

12. The method of claim 1, wherein the first user wishes to borrow the asset from the second user.

13. The method of claim 1, further comprising:
    receiving, by the full node, image data for the asset; and
    storing, by the full node, the image data for the asset on the blockchain, wherein the image data comprises bitmap data associated with an image of the asset.

14. The method of claim 1, further comprising:
receiving, by the full node, image data for the asset; and
storing, by the full node, the image data for the asset on the blockchain, wherein the image data comprises location data associated with a location the asset.

15. A full node comprising:
a processor;
a non-transitory computer readable medium comprising a blockchain and code, executable by the processor, for performing operations comprising:
receiving an asset request message comprising an asset type associated with an asset and a first user identifier from a first user device operated by a first user;
determining an entry in the blockchain associated with the asset type, wherein the entry includes at least a second user identifier;
transmitting, to a second user device associated with the second user identifier and operated by a second user, a contract request message comprising the asset type and the first user identifier;
receiving, from the second user device, a contract response message indicating whether or not to create a smart contract;
if the contract response message indicates to create the smart contract, generating the smart contract including at least the first user identifier, the second user identifier, the asset type, and a smart contract identifier;
generating a new entry for a block of the blockchain, comprising at least the smart contract;
generating the block of the blockchain;
transmitting the block to a plurality of full nodes, wherein the plurality of full nodes respectively verify the block;
storing the block on the blockchain; and
transmitting an indication of whether or not the block was stored on the blockchain to the first user device and the second user device.

16. The full node of claim 15, wherein the first user identifier is a first public key associated with the first user device, and the second user identifier is a second public key associated with the second user device.

17. The full node of claim 15, wherein the full node is a computer in a distributed computer network.

18. A system comprising:
a full node comprising
a processor,
a non-transitory computer readable medium comprising a blockchain and code, executable by the processor, for performing operations comprising:
receiving an asset request message comprising an asset type associated with an asset and a first user identifier from a first user device operated by a first user,
determining an entry in the blockchain associated with the asset type, wherein the entry includes at least a second user identifier,
transmitting, to a second user device associated with the second user identifier and operated by a second user, a contract request message comprising the asset type and the first user identifier,
receiving, from the second user device, a contract response message indicating whether or not to create a smart contract,
if the contract response message indicates to create the smart contract, generating the smart contract including at least the first user identifier, the second user identifier, the asset type, and a smart contract identifier,
generating a new entry for a block of the blockchain, comprising at least the smart contract,
generating the block of the blockchain,
transmitting the block to a plurality of full nodes, wherein the plurality of full nodes respectively verify the block,
storing the block on the blockchain, and
transmitting an indication of whether or not the block was stored on the blockchain to the first user device and the second user device; and
the plurality of full nodes.

19. The system of claim 18, further comprising:
the first user device; and
the second user device.

* * * * *